United States Patent [19]

Makar

[11] Patent Number: 4,827,622

[45] Date of Patent: May 9, 1989

[54] TAPE MEASURE

[76] Inventor: Marko Makar, 7-7883 Knight St., Vancouver, British Columbia, Canada

[21] Appl. No.: 151,607

[22] Filed: Feb. 2, 1988

Related U.S. Application Data

[63] Continuation-in-part of Ser. No. 26,270, Mar. 16, 1987, abandoned.

[30] Foreign Application Priority Data

Aug. 25, 1986 [CA] Canada .................................. 516766

[51] Int. Cl.[4] .............................................. G01B 3/10
[52] U.S. Cl. .................................. 33/770; 33/DIG. 1
[58] Field of Search .............. 33/137 R, 138, DIG. 1, 33/173

[56] References Cited

U.S. PATENT DOCUMENTS

| | | | |
|---|---|---|---|
| 2,663,941 | 12/1953 | Dart | 33/138 X |
| 2,704,890 | 3/1955 | Welsch | 33/DIG. 1 X |
| 3,036,791 | 5/1962 | Siggelkow | 33/138 X |
| 3,145,477 | 8/1964 | Morrison | 33/138 X |
| 3,427,921 | 2/1969 | Moll | 33/138 X |
| 3,744,134 | 7/1973 | Zims | 33/138 |
| 4,294,016 | 10/1981 | Wickerson | 33/138 X |
| 4,353,167 | 10/1982 | Martin | 33/137 R |

FOREIGN PATENT DOCUMENTS 9556 of 1891 United Kingdom ................ 33/3 A

*Primary Examiner*—Harry N. Haroian
*Attorney, Agent, or Firm*—Fetherstonhaugh & Co.

[57] ABSTRACT

An attachment for a flexible tape measure. The tape measure includes a tape having calibrations marked on it. The attachment has a bracket slidably received with a frictional fit on the tape. The fit requires application of a slight force to move the bracket. A housing is formed in the bracket, and a magnet is received in the housing and positioned to align with an end of the tape, parallel with the calibration marks. The attachment allows multiple uses of the tape measure, for example, as a level and a square.

7 Claims, 3 Drawing Sheets

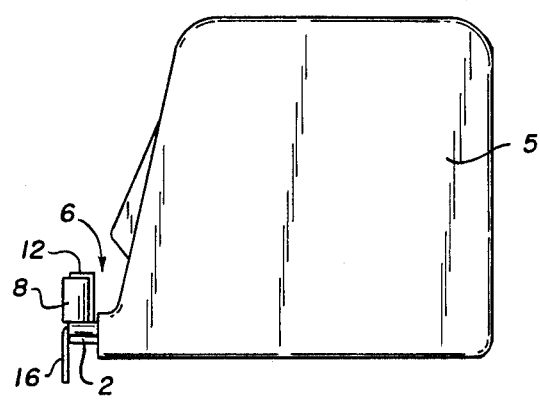
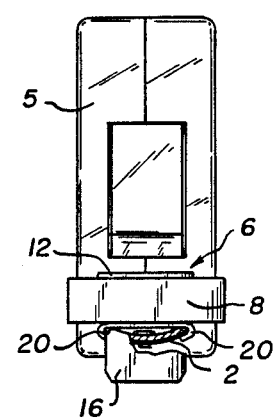
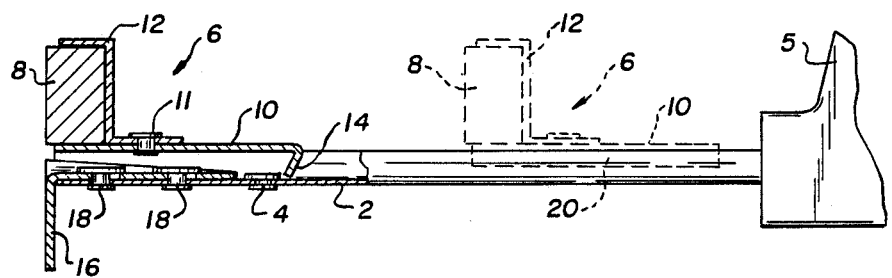
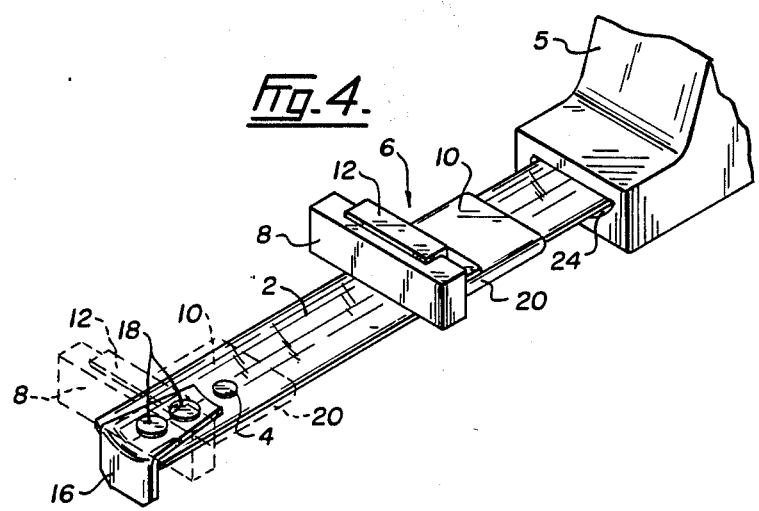

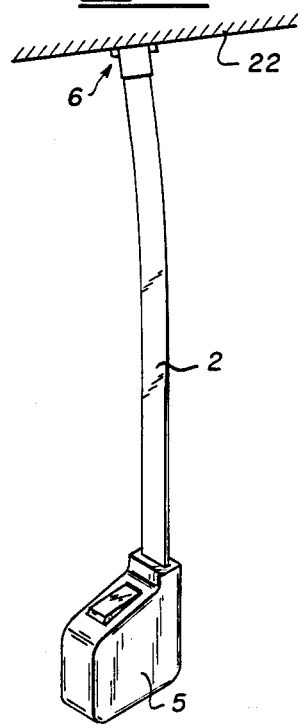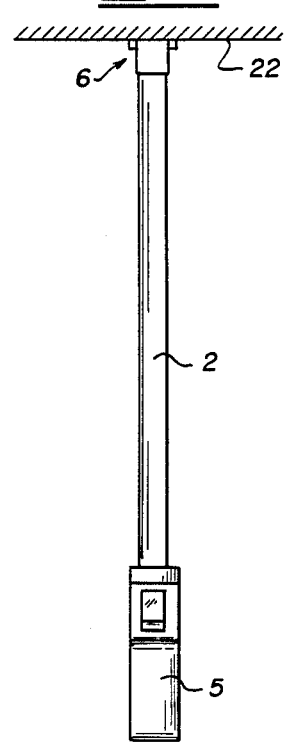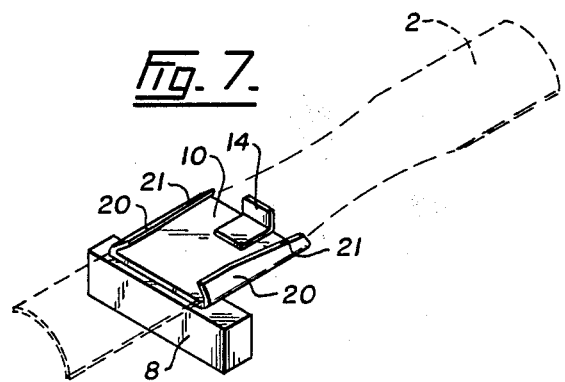

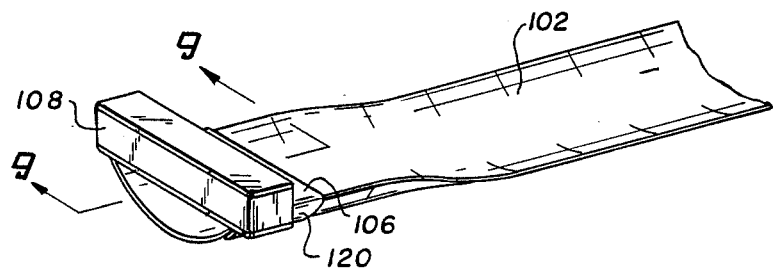
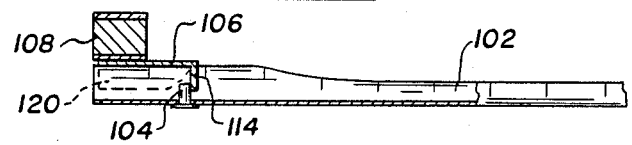
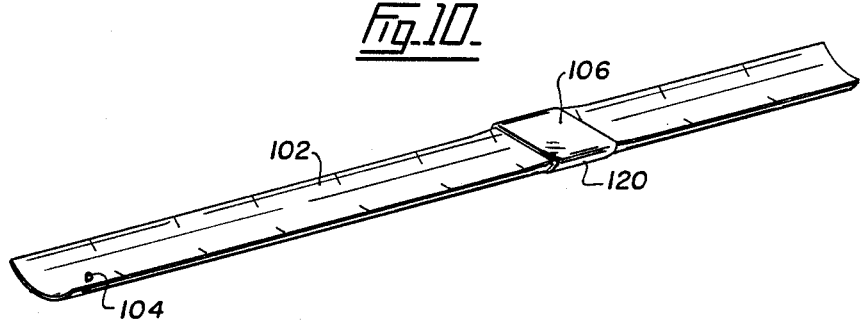
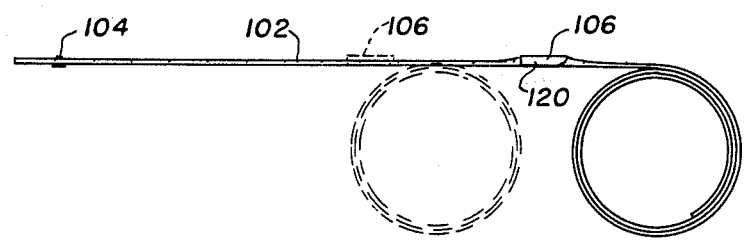

TAPE MEASURE

CROSS-REFERENCE TO RELATED APPLICATION

This application is a continuation-in-part of application Ser. No. 026270, filed 16 Mar. 1987, now abandoned, the disclosure of which is incorporated by reference.

FIELD OF THE INVENTION

This invention relates to attachment for a flexible tape measure.

DESCRIPTION OF THE PRIOR ART

Flexible tape measures are well known and extremely useful. Probably the preferred commercial form comprises a tape that can be rolled upon a receiver located in a housing. There may be a spring mechanism allowing retraction of the tape upon its release and, in better quality tape measures, a braking mechanism, typically in the form of a button that is pressed against the tape, to prevent the automatic return working. These tapes typically include an end piece, adapted to engage behind an object to define a starting place for a measurement. Such an end piece is slidably positioned, typically by rivets, so that both the inner or outer face of the end piece, whichever is contacting the object, can be aligned with the zero point on the calibration mark on the tape.

There are, however, certain disadvantages in using a flexible tape. Although the end piece, referred to above, facilitates measurement there must be a surface for the end piece to engage. Furthermore tape measures in the prior art are essentially only useful as measuring devices but it is always desirable to have a tool able to perform more than one task.

The prior art has suggested tape measures that are multi-functional. In particular the prior art describes tape measures provided in association with magnets but these measures have achieved very limited commercial success. Examples of the prior art known to applicant include U.S. Pat. Nos. 4,353,167 to Martins; 3,611,576 to Quenot; 3,145,477 to Morrison; 3,100,937 to Burch; 3,063,791 to Siggelkow; 992,170 to Crane; 2,663,941 to Dart; 2,591,383 to Bellmer; 3,744,134 to Zima; 3,427,721 to Moll; 4,294,016 to Wilkerson; 2,704,890 to Welsch and British patent No. 9556 to York.

The patents of most interest are those to Dart and Burch but there are a number of problems associated with both of the two magnet designs. These include both material properties and magnet design. First, as to materials, there are currently four types of magnetic materials that are suitable for use as permanent magnets. These are the Alnico alloys, ferrites, cobalt-rare earth alloys and neodynium-iorn alloys. In the period that the two designs were patented, only the alnicos and the ferrites were available. Cobalt-rare earth magnets were introduced in the late 1970's, and the neodynium-iron magnets were discovered in 1984. It would be difficult to use the latter two materials in either of the designs as both are extremely hard and brittle. They are produced only as square, thin slabs. The complicated shapes shown in the two designs would be impossible to make, at least with the current technology.

The ferrite material is also hard and brittle, but its ceramic nature makes it relatively easy to cast into complex shapes. However, it can also break very easily and the various notches and thin shapes in both of the designs will cause a ferrite magnet to be broken easily in everyday use. Recent developments would allow these designs to be made from ferrite powder, but this entails mixing the powder into a plastic base and then casing the plastic into the appropriate shape. The end result is quite tough, but the holding strength of the magnet is reduced considerably as only ⅛ to ¼ of the magnet would actually be ferrite power.

The other material is an Alnico alloy, made up of varying proportions of iron, nickel, aluminum and cobalt. This material is relatively easy to cast, but has the unfortunate property of demagnetizing easily. Because there is a "knee" in the Alnico magnetization curve, each time the magnet is removed from a steel surface it will have a slightly smaller magnetic field. The material is also susceptible to demagnetization from stray magnetic fields. The other magnetic materials do not have knees in their demagnetization curve, so they are relatively immune to demagnetization problems.

As to magnet design the first major problem with the Dart and Burch designs is that they can only be made with magnetic materials that are not really suitable for the purpose. The ferrite powder magnet would not produce a strong enough magnetic field to hold the magnet to the steel under a moderate force, while the Alnico magnet would demagnetize in use, rendering the magnet useless.

Dart's magnet is easily mounted on the end of a tape, and holds the end of the tape to a steel surface. It can not function in the same way as the present invention, which has the magnetic surface that contacts the surface rotated 90° from that of Dart. The Dart design allows for measurements along steel sheets, etc. while the present design allows for measurements at right angles to steel objects.

Dart's design will also produce a magnetic field that is inefficient at what it was intended to do. The various notches in the design allow much of the magnetic field to jump across the air gaps, reducing the amount that is available to hold the magnet to the steel surface. Furthermore, when the measuring tape is in place as shown in Dart, much of the field that would have gone into the steel surface below the magnet will instead be directed through the steel tape which, as Dart states in his patent, will act as a keeper for the magnet. The reduction in the strength of the field is thus likely to be considerable. The field line patterns in Dart would generally be centered on the lateral extensions 12 in FIGS. 2 and 4 of Dart.

Burch's design performs the same function as Dart's with the modification that the magnet is attached to the edge of the steel sheet rather than to the flat top. It will not perform the same functions as the present invention, and is less efficient at what it does than Dart's invention. For instance, the Burch design cannot be used on thin sheets of metal as there would be nowhere for the magnet to be attached against.

The magnet components of the Burch invention are not ideal. Normal procedure calls for the poles of the magnet to either both be in contact with the metal that is to be held, or for one end to be in contact with the metal and the other to be in contact with a steel pole piece that will transfer the magnetic field to the metal. Only flat, wide, square magnets avoid this requirement, and then only in such non-critical applications as refrigerator magnets. Burch's invention has the north pole of the larger magnet in the air. This will cause a large amount of wasted flux travelling through the air form the north to south pole. The side of the "U" that is opposite to the north pole will act as a keeper if it is not magnetized, or as another source of waste flux if it is magnetized.

The magnetized horseshoe does not serve any practical purpose in terms of magnetism. While it may be useful as a handle for extending the tape, magnetizing the horseshoe would only cause problems. The magnetized horseshoe will produce flux paths that are at 90° to or actually opposed to the ones produced by the main magnet. This will tend to cause the demagnetization of the magnets. The size of the horseshoe is such that the force produced by them will be small compared to the force produced by the main magnet.

Thus the inventions of Dart and Burch are not ideal due to both materials and design problems. The construction of either requires the use of relatively poor magnetic materials that will produce weak magnetic fields, or that will demagnetize quickly. Both are inefficient in terms of the use of the available magnetic field, and both will tend to demagnetize due to this inefficiency. Burch's design also has an extra magnet that serves no practical purpose and will demagnetize the main magnet.

SUMMARY OF THE INVENTION

However, the present invention is unique in its simplicity and in its ability to impart a number of additional useful features to an already useful device.

Accordingly, the present invention is an attachment for a flexible tape measure, the tape measure including a tape having calibrations marked on it and an end piece located on an end of the tape, the attachment comprising a bracket slidably received with a frictional fit on the tape, the fit requiring application of a slight force to move the bracket; a housing formed in the bracket; a rectangular magnet received in the housing, positioned to align with an end of the tape, parallel with the calibration marks and extending beyond the sides of the tape.

In a further aspect the invention is an attachment for a flexible tape measure, the tape measure including a calibrated tape and a stop adjacent one end of the tape, the attachment comprising a bracket slidably received with a frictional fit on the tape, the fit requiring application of a slight force to move the bracket; and an abutment on the bracket to contact the stop on the tape.

The magnet should be able to exert sufficient force to support the weight of the tape measure.

BRIEF DESCRIPTION OF THE DRAWINGS

Aspects of the invention are illustrated, merely by way of example, in the accompanying drawings in which:

FIG. 1 is a side elevation of a flexible tape measure, modified by the incorporation of an attachment according to the present invention;

FIG. 2 is an end elevation of the tape measure of FIG. 1;

FIG. 3 illustrates a detail of the operation of the device of FIGS. 1 and 2;

FIG. 4 illustrates a further feature of the operation of the device;

FIGS. 5 and 6 illustrate a use of the tape measure of the invention;

FIG. 7 shows the attachment process;

FIG. 8 is a partial isometric view of a modification of the main invention;

FIG. 9 is a side elevation of FIG. 8;

FIG. 10 illustrates a further modification of the invention; and

FIG. 11 shows the use of the FIG. 10 embodiment.

DESCRIPTION OF THE PREFERRED EMBODIMENTS

The drawings show an attachment for a flexible tape measure. The tape measure is conventional insofar as it includes a tape 2 having calibrations (not shown) marked on it and contained within a case 5. The tape 2 has a stop 4 found in it. A rivet is shown. The attachment comprises, as shown particularly in FIG. 3, a bracket 6 carrying a magnet 8 and slidably received with a frictional fit on the tape 2. The fit of the bracket 6 on the tape 2 is such that the bracket 6 requires the application of a slight force to move it on the tape. Preferably the magnet is magnetized parallel to its length so that the face can attach to a magnetic object with maximum force.

The bracket 6 comprises a base member 10 to which is riveted, by a rivet 11, an upper member 12 defining a housing to receive magnet 8. The magnet 8 is positioned, as shown particularly in FIGS. 1 and 3, to align with an end of the tape 2, parallel with the calibration marks. Base member 10 is formed with a tab 14 able to contact stop 4—see FIG. 3.

The tape 2 desirably includes a conventional end piece 16, adapted to engage behind an object to define a starting place for a measurement for an outside measurement. End piece 16, again as is conventional, is riveted to the tape by rivets 18. The arrangement of end piece 16 is conventional. It can move on rivets 18 by an amount equal to its thickness. This is conventional in the art and allows accurate measurement without having to allow for the thickness of end piece 16.

As shown most clearly in FIG. 2 the tape 2 is bowed. The base member 10 has lugs 20 extending downwardly to grip the tape 2. As indicated above the grip of the lugs 20 should provide a relatively tight frictional fit so that, for example, mild hand force is required to move the bracket 6, and thus the magnet 8, on the tape 2. Lugs 20 are preferably cut away at 21 as shown in FIG. 7 to facilitate mounting bracket 6 on tape 2.

In its simplest use the attachment remains at the end of the tape, the position shown in FIG. 3, and the magnet 8 is magnetically attached to a flat ferromagnetic surface to make an inside measurement. In this regard stop 4 and tab 14 are arranged so that when tab 14 abuts stop 4, as shown in FIG. 3, the end face of magnet 8 aligns with the retracted outer face of end piece 16. End piece 16 retracts by moving on rivets 18. The end face of the magnet 8 performs the function of locating the end of the tape 2, to provide an accurate measurement. Alternatively, and as shown in FIG. 4, the bracket 6 may be retracted and used to measure a distance from its leading surface to the end of the tape, for example the magnet may be abutted against a surface and an inward measurement, that is to the end of the tape 2, is then read by reading the calibration on the tape that aligns with the face of the magnet 8.

Outside measurements are carried out conventionally, using the inside face of catch 16 to contact the surface that defines the starting point for the measurement.

In a particularly preferred aspect the magnet may be attached to a magnetic surface 22 and suspended by its own weight as shown in FIGS. 5 and 6. Extension of the tape 2 from the case 5 then allows the device to be used as a level. If surface 22 is not level (see FIG. 5) the tape 2 twists and the case 5 tilts to the lower end of the surface. The position with level surface 22 is shown in FIG. 6.

By ensuring that the magnet 8 is precisely perpendicular to the tape 2 the magnet may also be used as a square. If necessary the magnet for this use can be extended compared with the length shown in the drawings.

The magnet 8 is preferably a ceramic magnet, easily and cheaply available. It should, of course, be of sufficient strength to adhere to a metal surface with the tape measure suspended from it.

The attachment can also be used to pick up objects with the magnet, either simply by extending the tape, and thus deriving the benefit of the length to which the tape can be extended, or by extending the flexible tape around a corner.

The bracket 6 can be put on the tape during manufacture or may be added later. The bracket 6 is positioned over a tape 2 and the lugs 20 pressed to the position shown in FIG. 2 until a quite tight frictional fit on the tape 2 is provided. Further the bracket 6 can be positioned by distorting tape 2 as shown in FIG. 7 and fitting the formed brackets over the tape 2. The cutting away of the lug 20 at 21 helps.

If desired the magnet 8 and the upper member 12 can be marked with calibrations to assist in making precise measurement.

Although not shown the case 5 of the tape measure can be modified, if desired, to provide a housing for the magnet 8 when the tape measure is not in use. Such a modification will simply require an enlargement of opening 22 in the case 5.

Similarly the stop 4 and tab 14 need not be present. The lugs 20 can simply abut the end piece 16 to define a starting point and to prevent the attachment sliding off the end of the tape. With this arrangement it may be necessary to adjust for the thickness of the end piece 16 when taking an inside measurement as pull on the tape may move the end piece outwardly longitudinally of the tape.

In place of rivet 11 the upper member 12 may be attached to base member 10 by welding or by the use of an adhesive. Similarly tab 14 may be separately formed (as shown in FIG. 7) and attached by adhesive or welding.

In a modification of the attachment shown in FIGS. 1 to 7 the upper member 12, defining a housing, may be dispensed with. Furthermore the invention can be used with spiral spring tapes.

These modifications are shown in FIGS. 8 to 11.

FIGS. 8 and 9 show a tape 102 having a stop 104. A bracket 106 is received on tape 102 with a frictional fit as described above. Bracket 106 has a magnet 108 directly attached to it, for example, by adhesive. Housing 12 of the previous embodiment is not present. Housing 12 facilitates accurate location of the magnet 8 but if care is taken in positioning the magnet on the bracket 106 housing 12 is not needed. Tab 114 projects from the underside of bracket 106 to act as an abutment to abut stop 104. Lugs 120 are shown.

FIGS. 10 and 11 illustrate an embodiment of the invention precisely the same as the embodiment of FIGS. 8 and 9 except that the magnet is dispensed with. That is the embodiment consists of bracket 106 with tab 114 and lugs 120.

The embodiment of FIGS. 10 and 11 finds particular application in measures as described, for example, in Canadian patent No. 653,379 issued Dec. 4, 1962 to Tigrett. The balanced tension springs described in that patent, when suitably calibrated, make ideal tape measures as they resile to a coiled position but can be extended and, provided the cross sectional curve is maintained, maintain the extended position. To roll the tape it is simply necessary to apply finger pressure to flatten the curved cross section and the tape then rolls automatically.

The disadvantage with these tapes is that they can roll automatically when it is not required that they do so, for example, when pressure is inadvertently applied. The embodiment of FIGS. 10 and 11 ensures that the curvature is maintained, by the lugs 120, so that the self-rolling action is inhibited by the curvature being maintained by the bracket. Thus the embodiment of FIGS. 10 and 11 prevents the tape measure coiling past the position of the bracket 106. Stop 104 is present on the tape to prevent the bracket 106 sliding off the end of the tape.

Desirably the tape is calibrated on both sides—see FIG. 9—with the zeros of each scale at opposite ends of the tape.

The bracket 106 without the magnet can be used in conjunction with the bracket 106 including a magnet. Indeed it is particularly desirable that it be so as the weight of the bracket, including the magnet, at one end of the tape can exert a force, when the tape is fully extended, tending to flatten the tape at one point and thus allowing the tape to roll when it is not desired that it do so. By positioning the bracket at a position, easily determined by experiment, along the length of the tape this unwanted, automatic rewinding of the tape can be prevented.

Thus the present invention provides a simple attachment that greatly extends the usefulness of a retractable tape measure. The attachment does not interfere with normal use of the tape and can be removed from the tape if not needed.

I claim:

1. An attachment for a flexible tape measure, the tape measure including a tape having calibrations marked on it, the attachment comprising:
   a bracket slidably received with a frictional fit on the tape, the fit requiring application of a slight force to move the bracket;
   a housing formed on the bracket;
   a magnet received in the housing and positioned to align with an end of the tape, parallel with the calibration marks and extending beyond the sides of the tape.

2. An attachment as claimed in claim 1 in which the tape measure includes a housing to receive the rolled tape.

3. An attachment as claimed in claim 1 in which the tape includes an end piece, adapted to engage behind an object to define a starting place for a measurement.

4. An attachment as claimed in claim 3 in which the bracket includes means to abut the end piece to ensure alignment of the magnet with the end of the tape.

5. An attachment as claimed in claim 4 in which the magnet is a ceramic magnet.

6. An attachment as claimed in claim 1 in which the bracket has lugs extending to grip the tape.

7. An attachment as claimed in claim 1 in which the tape has a stop;
   an abutment on the bracket to abut the stop to control the start position for the attachment on the tape.

* * * * *